United States Patent [19]
De Vincent et al.

[11] 3,869,153
[45] Mar. 4, 1975

[54] DOUBLE TUBE MOUNTING ASSEMBLY
[75] Inventors: Patsy De Vincent; John F. Wiechart, both of Dayton, Ohio
[73] Assignee: General Motors Corporation, Detroit, Mich.
[22] Filed: July 22, 1974
[21] Appl. No.: 490,384

[52] U.S. Cl.............. 285/137 R, 285/158, 285/189
[51] Int. Cl. ............................................ F16l 39/00
[58] Field of Search............ 285/137 R, 137 A, 189, 285/205, 206, 208, 193, 158, 414, 415, 174, 256, 406, 405, 363, 368, 364, 412

[56] References Cited
UNITED STATES PATENTS
| | | | |
|---|---|---|---|
| 1,363,713 | 12/1920 | Broido | 285/189 X |
| 2,475,468 | 7/1949 | Andrews | 285/137 R X |
| 3,188,119 | 6/1965 | Miller | 285/137 R X |
| 3,282,612 | 11/1966 | Younger | 285/137 R |

FOREIGN PATENTS OR APPLICATIONS
| | | | |
|---|---|---|---|
| 576,232 | 5/1924 | France | 285/137 R |
| 6,397 | 0/1914 | Great Britain | 285/137 R |

Primary Examiner—Thomas F. Callaghan
Attorney, Agent, or Firm—Arthur N. Krein

[57] ABSTRACT

A double tube mounting assembly as for securing a pair of hose tubes to a refrigerant compressor or the like having inlet and outlet openings therein to receive the free or pilot ends of the hose tubes. Each hose tube is provided with an annular upset bead adjacent to the pilot end of the tube which is sandwiched between a mounting plate, slotted at opposite ends to receive the tubes, and a centrally apertured yoke on each tube encircling the pilot end thereof, each yoke having spaced apart legs clamped around the side edges of the mounting plate. In the preferred embodiment, each yoke is welded or brazed to the annular bead of the tube with which it is associated to effect a fluid tight seal between these elements.

4 Claims, 4 Drawing Figures

PATENTED MAR 4 1975 3,869,153

DOUBLE TUBE MOUNTING ASSEMBLY

This invention relates to conduit tube connections and, in particular, to an arrangement for connecting tubes, such as hose tubes, to the flat port surface of associated accessories, such as the conduit block or head of a refrigerant compressor of the type used in vehicle air conditioning systems.

Specifically, this invention relates to a double hose tube mounting assembly to permit mounting of a pair of hose tubes to the refrigerant compressor of an automotive vehicle air conditioning system in a manner to provide for controlled hose departure orientation relative to the compressor while at the same time permitting off-line assembly or field serviceability of the hose connection.

In present day vehicle air conditioning systems, the refrigerant hoses, for example, from the discharge port and to the inlet port of the refrigerant compressor of such a system are each connected to the compressor by means of a tube fitting, each such tube fitting having one end thereof fixed to the flexible hose and its other end connected to the compressor. Such a tube fitting connection to the compressor is made either by means of a male-female threaded tube coupling or it may be fixed, as by brazing, to a compressor connector block which would also have a short pilot tube fixed thereon adapted to enter a corresponding sized hole or port in the compressor housing, such a compressor connector block then being fixed as by means of a bolt or spanner clamp to the machined pad or boss having the hole therein on the compressor housing.

When using a male-female threaded tube coupling to fix such a tube fitting to the compressor, it is difficult to maintain the proper departure orientation of the tube fitting relative to the compressor, such tube fittings normally being bent, when necessary, to provide a desired departure orientation relative to the compressor housing, such departure orientation being necessary due to the limited availability of space in the engine compartment of present day automotive vehicles. In addition, such male-female threaded tube couplings are subject to a number of potential leakage paths for the escape of refrigerant fluid. When the tube and compressor connector block arrangement is used for securing the tube to the refrigerant compressor, this arrangement also provides an excessive number of potential leakage paths for the loss of refrigerant fluid during service as, for example, around the brazed connections. In addition, in both of these prior art arrangements, substantial machining is required to either fabricate the male-female threaded tube coupling or to fabricate the compressor connector block.

It is therefore the principal object of this invention to provide an improved double tube mounting assembly for securing a pair of hose tubes or the like to an accessory wherein leakage paths are reduced to a minimum.

Another object of this invention is to provide an improved double tube mounting assembly wherein the elements of this assembly associated with a pair of tubes are fabricated as sheet metal stampings.

A still further object of this invention is to provide an improved double tube mounting assembly, for securing conduits such as hose tubes to a compressor or the like, which permits field serviceability of the hose tubes.

These and other objects of the invention are obtained by means of a double tube mounting assembly in which a pair of hose tubes, for example, to be mounted into suitable passage openings in the boss of a compressor are each provided with an upset annular bead adjacent to a pilot end of each tube. A centrally apertured yoke is positioned to encircle the pilot end of a tube in abutment against and is brazed or welded to the bead. Each yoke has opposed, spaced apart legs integral therewith and extending axially along the tube in position to be engaged about the edges of a mounting plate positioned to partly encircle each tube and abut against the bead thereon whereby the mounting plate is fixed to the tubes. The mounting plate is provided with at least one aperture therethrough to receive a fastener used to secure this assembly to the compressor.

For a better understanding of the invention, as well as other objects and further features thereof, reference is had to the following detailed description of the invention to be read in connection with the accompanying drawings, wherein.

Figure 1:
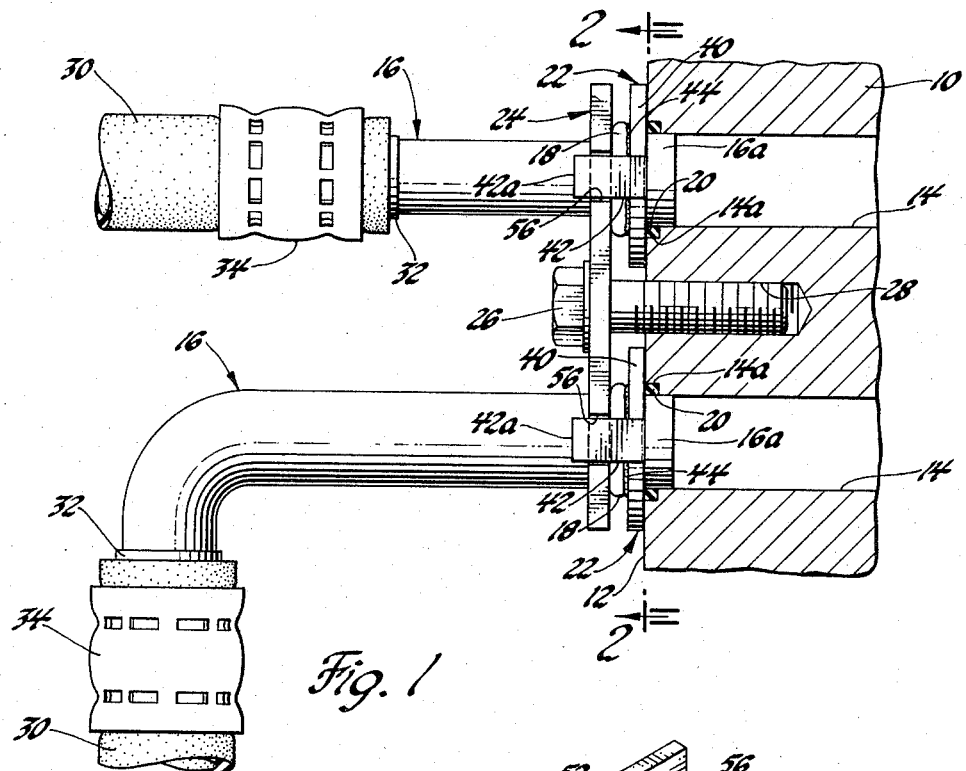
FIG. 1 is a view, partly in section showing a double tube mounting assembly in accordance with the invention used to secure a pair of hose tubes to the flat port surface of an associated accessory, such as a refrigerant compressor.
Figure 2:
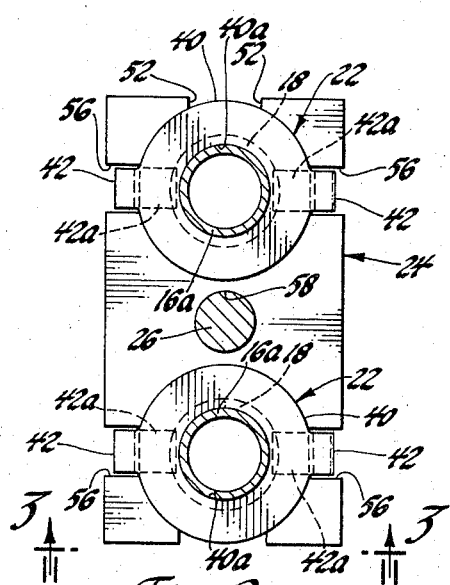
FIG. 2 is a view taken along line 2—2 of FIG. 1.

Referring first to FIG. 1, there is illustrated the housing 10 of a compressor or similar accessory having a machined pad or boss 12 with a pair of bored passages 14 therein, one of which may be the inlet passage and the other the outlet passage for the compressor. The bore diameter of each of the passages 14, at least for a preselected distance adjacent to the boss 12, is sized such as to each slidably receive the coupling end of a tube 16 associated therewith. For purposes of illustration only, one of the tubes 16, the tube inserted into the top bored passage 14, as seen in FIG. 1, is illustrated as a straight tube while the other tube is shown as having a right angle bend therein intermediate its ends to show different departure orientations of the tubes relative to the machined boss 12. It should be realized, however, that these tubes could be bent, as desired, to obtain any departure orientation required for a tube relative to the machined boss 12.

In accordance with the invention, each tube 16, preferably thin walled and of uniform thickness, is provided at one end, the coupling end, with an annular bead 18, which may be upset, as shown, or otherwise provided on the tube to extend radially out from the nominal outside diameter of the main body portion of the tube, this bead 18 being spaced a predetermined distance from the one end of the tube, the righthand or coupling end as seen in FIG. 1, to provide a pilot portion 16a for entry into a bored passage 14 of the housing 10. An O-ring 20, to provide a fluid seal, is positioned to encircle the pilot portion 16a for abutment against one leg of a yoke, generally designated 22, secured to the tube in abutment against the bead 18 of the tube. A mounting plate 24 is slotted at opposite ends to receive the tubes 16 and is positioned to abut against the bead 18 on each tube opposite to the yoke 22, a portion of the legs of each yoke being deformed about the side edges of the mounting plate to retain the tubes 16, yokes 22 and mounting plate 24 as a unitary assembly. The pair of tubes are shown retained in fixed axial position relative to the housing 10 with the O-ring 20 compressed in sealing engagement between the yoke 22 and a surface of the housing 10 by a suitably threaded fastener, such as machine screw 26, extending through a suitable aperture provided for this purpose in the mounting plate 24 for threaded engagement into the threaded aperture 28 in housing 10, the aperture 28, in the embodiment illustrated, being aligned in a common plane with the axes of passages 14.

Although the tube 16 may be any suitable type rigid conduit, each tube, for purposes of illustration only, is shown as being a hose connector tube for a hose 30. For this purpose, each tube, at the end opposite the coupling end which includes pilot portion 16a of the tube, is provided, for example, with a barbed end portion, not shown, adapted to be inserted into the internal passage or inner tube of a hose 30 with the end of the hose positioned to abut against an annular collar 32 provided for this purpose on each tube, a collar or sleeve 34 being positioned to encircle the hose and crimped into engagement therewith whereby the hose is axially retained on the tube.

Figure 4:
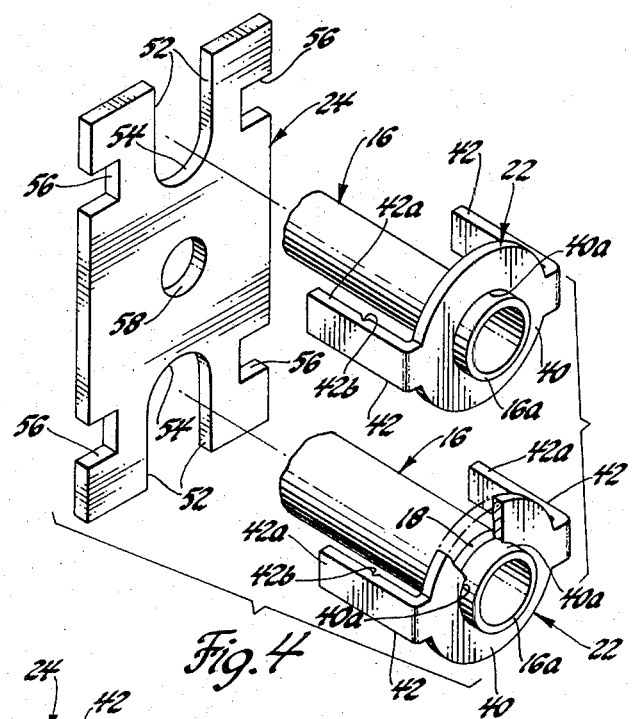
FIG. 4 is an exploded, perspective view of the double tube mounting assembly of FIG. 1 prior to the assembly of the tubes and yokes to the mounting plate of this assembly.
Figure 3:
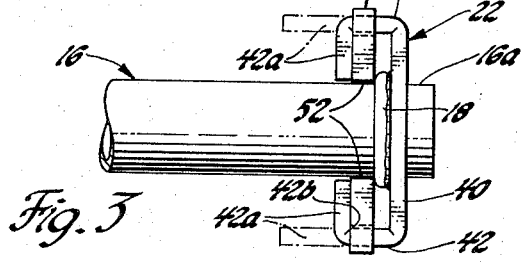
FIG. 3 is a view taken along line 3—3 of FIG. 2.

In the preferred embodiment of the invention shown, each yoke 22, made of a suitable material and fabricated, for example, as a metal stamping, is substantially U-shaped in its original configuration, as best seen in FIGS. 3 and 4, prior to its assembly to the mounting plate 24. Each yoke 22 includes a base or bight in the form of a disc 40, with a central aperture 40a therethrough, and a pair of legs 42 formed integral with and extending at right angle to the disc 40 on opposite sides thereof. As formed, the legs 42 extend in spaced apart relation to each other parallel to the bore of aperture 40a, but in the assembled configuration of these legs, a free end portion of each leg is bent over to form lock tabs 42a in locking engagement against the surface on one side of the mounting plate 24. If desired, score lines 42b can be provided on the legs 42 to facilitate bending of the tabs 42a.

The aperture 40a in disc 40 is of a diameter to just slidably receive the pilot portion 16a of a tube 16 so that when this disc of yoke 22 is fitted onto the pilot portion of tube 16, the outboard surface of this disc will provide a radial extending, annular seat for the O-ring 20 encircling the tube 16.

A yoke 22 is assembled to a tube 16 by passing the free end or pilot portion 16a thereof through the aperture 40a of disc 40, with the legs 42 away from this end of the tube, and then moving the disc axially along the tube until it abuts against the free tube end side of the bead 18. If desired, the yoke 22 can be rotated relative to the tube 16 to effect proper departure orientation of the tube from the boss 12 of housing 10, after which the bead 18 and the disc 40 are brazed, welded or otherwise secured together, for example, by a full 360° weld bead 44 to effect a complete fluid seal between these elements as to prevent axial or rotative movement of the yoke 22 relative to tube 16. In the embodiment illustrated, the bottom tube 16 of FIG. 1 is fixed to the yoke 22 so that the axis of the hose end of this tube is angularly displaced 90° relative to the legs 42 of this yoke 22.

In the embodiment shown, the mounting plate 24, in the form of a flat, rectangular sheet metal stamping of suitable thickness is formed to permit the coupling of a pair of tubes 16 to the housing 10 of an accessory and, accordingly, is centrally bifurcated at opposite transverse ends to provide a pair of aligned slots of a suitable length and width as defined by spaced apart, parallel sides 52 and an interconnecting arcuate portion 54 formed complementary to the outside diameter of the tubes 16 so that these tubes can be slidably received in these slots. In addition, the longitudinal sides of the mounting plate 24 are formed with opposed, locking slots 56 of a shape complementary to the cross sectional shape of the legs 42 to receive the set of legs 42 of a yoke 22 when the mating tube 16 is fully seated in the slot and with the mounting plate 24 abutting the inboard side of bead 18 to thereby effect locking of the yoke 22 and therefore the tube attached to the yoke against rotation relative to the mounting plate 24. With one surface of the mounting plate 24 in abutment against the inboard side of the bead 18, the tab portions 42a of the legs 42 of the yoke 22 is then bent over, from the broken line position shown in FIG. 3 to the solid line position, to engage the opposite surface of the mounting plate 24 to fix the tube 16 to the mounting plate. With this arrangement, the tube 16 is fixed against axial or rotational movement relative to the mounting plate.

The mounting plate 24 is also provided with one or more fastener receiving apertures 58, only one being shown in the embodiment disclosed, to receive fasteners, such as machine screw 26, whereby the subject double tube mounting assembly can be secured to the housing 10. In the embodiment disclosed, the mounting plate 24 is provided with one centrally located aperture 58 whereby a single machine screw 26 is used to secure this assembly to the housing 10.

In the embodiment of the invention illustrated in FIG. 1, each of the seal rings, such as the O-rings 20, is shown seated in a counterbore 14a coaxial with a bored passage 14 in the housing 10. However, it should be realized that, if desired, these seals could be seated against the machined pad 12 with the pilot portion 16a of each tube suitably elongated for positioning of these ring seals in this manner.

Although the tube mounting arrangement of the invention has been illustrated in one embodiment as used to secure two tubes to an accessory, such as housing 10, it will be apparent to one skilled in the applicable art that the mounting plate 24 can be readily modified to permit the mounting of any number of tubes in the manner disclosed.

What is claimed is:

1. A tube mounting assembly for securing N number of tubes to an accessory housing, the accessory housing having an N number of bored passages to receive the tubes, each of the tubes having an annular upset bead adjacent one end of the tube with a pilot tube portion extending outboard from one side thereof for insertion into one of the bored passages, a yoke for each tube, each yoke having a centrally apertured disc encircling said pilot tube portion on one of said tubes in abutment against the outboard side of said bead, an annular weld means around said bead securing and sealing said bead to said disc, an O-ring positioned to encircle the pilot tube portion of each tube in abutment against said disc of said yoke associated with said tube and, a mounting plate having an N number of tube receiving slot openings on opposite ends thereof with one of the N number of tubes positioned in each of said slots, said mounting plate further including an N number of opposed sets of locking slots on opposite sides thereof for each said slot aligned with the axis of one of said tubes positioned in said slot, said mounting plate being positioned on the opposite side of said bead in abutment thereagainst from said disc of said yoke associated therewith, each said yoke further including spaced apart legs extending axially from said disc for engagement with one of said sets of locking slots to lock said yoke and therefore said tube associated therewith against rotation relative to said mounting plate, each said leg including a leg portion bent over to engage the opposite side of said mounting plate from said disc, said mounting plate having aperture means therethrough to receive fastener means for securing said mounting plate to the accessory housing with each said yoke and each said O-ring sandwiched therebetween with said O-ring in sealing engagement with said disc of said yoke associated therewith and the accessory housing.

2. A tube mounting assembly according to claim 1 wherein the N number of tubes is two and the N number of tube receiving slot openings in said mounting plate is two and, wherein said aperture means in said mounting plate is a central aperture through said mounting plate.

3. A dual tube mounting assembly including a pair of tubes to be secured to an accessory housing having a pair of spaced apart bored passages to receive said tubes and a fastener receiving means intermediate said passages, each said tube having a pilot tube portion at one end thereof for insertion into a bored passage in the accessory housing and an annular upset bead at the inboard end of said pilot tube portion, a flat mounting plate having a pair of slots, one on each end thereof to partly encircle one of said tubes and positioned so that the side of said bead opposite said pilot tube portion is in abutment against one surface of said mounting plate, said mounting plate further including side lock notches on opposite edge sides of each of said slots to provide a set of locking notches and a central aperture extending through said mounting plate to receive a fastener means for securing said mounting plate to the accessory housing, a pair of yoke means, each said yoke means encircling one of said tubes around said pilot tube portion thereof in abutment against the opposite side of said bead on said tube, said yoke means including leg means extending into engagement in one set of said locking notches with a portion thereof extending over the opposite surface of said locking plate whereby said bead is rigidly sandwiched between said mounting plate and said yoke means.

4. A dual tube mounting assembly according to claim 3 wherein each said yoke means includes a disc having a central aperture therethrough receiving said pilot tube portion of one of said tubes and wherein said leg means includes a pair of legs, one on each of opposite sides of said disc with each leg integral at one end with said disc and each leg extending axially inboard along said tube from said disc to engage into one of said locking slots, each said leg including a bent tab portion at the free end thereof engaging the opposite surface of said mounting plate from said bead and, said assembly further including an annular weld bead around said bead securing said bead to said disc of said yoke means.

* * * * *